(12) United States Patent
Friedman

(10) Patent No.: US 11,026,380 B2
(45) Date of Patent: Jun. 8, 2021

(54) VERTICAL ASSEMBLY FOR GROWING PLANTS

(71) Applicant: Freight Farms, Inc., Boston, MA (US)

(72) Inventor: Jon Friedman, Boston, MA (US)

(73) Assignee: FREIGHT FARMS, INC., Boston, MA (US)

( * ) Notice: Subject to any disclaimer, the term of this patent is extended or adjusted under 35 U.S.C. 154(b) by 553 days.

(21) Appl. No.: 15/886,934

(22) Filed: Feb. 2, 2018

(65) Prior Publication Data

US 2018/0153116 A1     Jun. 7, 2018

Related U.S. Application Data

(63) Continuation of application No. 15/219,410, filed on Jul. 26, 2016, now Pat. No. 9,883,642.

(60) Provisional application No. 62/349,822, filed on Jun. 14, 2016.

(51) Int. Cl.

| *A01G 31/02* | (2006.01) |
| *A01G 9/02* | (2018.01) |
| *A01G 31/06* | (2006.01) |
| *A01G 22/00* | (2018.01) |
| *A01G 31/00* | (2018.01) |

(52) U.S. Cl.
CPC .............. *A01G 31/06* (2013.01); *A01G 9/025* (2013.01); *A01G 22/00* (2018.02); *A01G 2031/006* (2013.01); *Y02P 60/20* (2015.11)

(58) Field of Classification Search
CPC .. A01G 31/06; A01G 2031/002; A01G 31/02; A01G 9/022; A01G 9/023; A01G 9/024; A01G 9/025; A01G 9/028; A01G 22/00; A01G 2031/006
See application file for complete search history.

(56) References Cited

U.S. PATENT DOCUMENTS

| 4,295,296 A | 10/1981 | Kinghorn |
| 4,950,218 A | 8/1990 | Tsuru et al. |
| 5,511,340 A | 4/1996 | Kertz |
| 5,579,603 A | 12/1996 | Fukuzumi |

(Continued)

FOREIGN PATENT DOCUMENTS

| CA | 2309894 A1 | 11/2001 |
| CH | 706-820 A2 | 2/2014 |

(Continued)

OTHER PUBLICATIONS

U.S. Appl. No. 15/219,410, filed Jul. 26, 2016, Jon Friedman.

(Continued)

*Primary Examiner* — Kathleen I Alker
(74) *Attorney, Agent, or Firm* — Arent Fox LLP

(57) ABSTRACT

A device for growing plants is provided. The device has a panel assembly on which a one or a plurality of nutrient flow channels is supported to provide nutrient flow passages from an inlet at an upper region to an outlet at a lower region of the support panel. A plurality of grow pockets is supported on an opposite side face of the support panel, the grow pockets in alignment with the nutrient flow channels. Each grow pocket has a plant access opening. A fluid aperture in the support panel is disposed at a lower region of each grow pocket for fluid communication between an interior of the grow pocket and the aligned nutrient flow passage.

19 Claims, 16 Drawing Sheets

(56) References Cited

U.S. PATENT DOCUMENTS

| | | | |
|---|---|---|---|
| 6,016,628 | A | 1/2000 | Schlosser |
| 6,021,602 | A | 2/2000 | Orsi |
| 7,832,144 | B2 | 11/2010 | Corradi |
| 8,281,517 | B2 | 9/2012 | MacKenzie |
| 8,365,466 | B1 | 2/2013 | Storey |
| 8,950,112 | B2 | 2/2015 | dos Santos |
| 8,966,819 | B1 | 3/2015 | Cosmann |
| 9,210,846 | B2 | 12/2015 | VanLente |
| 9,226,457 | B2 | 1/2016 | Laurence et al. |
| 9,288,948 | B2 | 3/2016 | McNamara et al. |
| 10,517,230 | B2 * | 12/2019 | Law ............ A01G 25/00 |
| 2003/0089037 | A1 | 5/2003 | Ware |
| 2005/0166451 | A1 | 8/2005 | Stachnik et al. |
| 2006/0156624 | A1 | 7/2006 | Roy et al. |
| 2009/0223126 | A1 | 9/2009 | Garner et al. |
| 2010/0024292 | A1 | 2/2010 | Kertz |
| 2011/0059518 | A1 | 3/2011 | Bribach et al. |
| 2011/0215937 | A1 | 9/2011 | Carroll et al. |
| 2011/0219688 | A1 | 9/2011 | Nelson et al. |
| 2011/0302837 | A1 | 12/2011 | Chen |
| 2012/0005958 | A1 | 1/2012 | Laitsch |
| 2012/0066972 | A1 | 3/2012 | Lin |
| 2012/0247010 | A1 * | 10/2012 | Huber ............ A01G 9/024 47/29.1 |
| 2012/0317922 | A1 | 12/2012 | Chang |
| 2013/0104456 | A1 | 5/2013 | Smith |
| 2013/0219788 | A1 | 8/2013 | VanLente |
| 2014/0318011 | A1 | 10/2014 | Jarvinen |
| 2014/0373443 | A1 | 12/2014 | Liu et al. |
| 2015/0289452 | A1 | 10/2015 | Axley et al. |
| 2015/0296724 | A1 | 10/2015 | Martinez Ruanova |
| 2016/0037739 | A1 | 2/2016 | Fankuchen et al. |

FOREIGN PATENT DOCUMENTS

| | | | |
|---|---|---|---|
| CN | 202406632 | | 9/2012 |
| DE | 10-2010-045-666 | A1 | 3/2012 |
| DE | 20-2013-001-140 | U1 | 4/2013 |
| EP | 1803346 | A2 | 7/2007 |
| EP | 2399449 | A2 | 12/2011 |
| EP | 2428110 | A1 | 3/2012 |
| ES | 2393571 | A1 | 12/2012 |
| FR | 2680626 | A1 | 5/1993 |
| FR | 2872529 | A1 | 1/2006 |
| FR | 2956283 | A1 * | 8/2011 ............ A01G 9/025 |
| FR | 2956283 | B1 | 8/2011 |
| FR | 2959387 | A1 | 11/2011 |
| FR | 2966323 | A1 | 4/2012 |
| GB | 2070403 | A | 9/1981 |
| GB | 3607772 | A1 | 8/1986 |
| GB | 2454678 | A | 5/2009 |
| JP | 03-133324 | A | 6/1991 |
| JP | 05-076252 | A | 3/1993 |

OTHER PUBLICATIONS

International Search Report and Written Opinion issued by the International Searching Authority in International Patent Application No. PCT/US2017/037426, dated Aug. 31, 2017.

Machine translation of FR 2680626 to Lassale, dated Mar. 1993.

Machine translation of FR 2872529 to Gerard, dated Jan. 2006.

* cited by examiner

VERTICAL ASSEMBLY FOR GROWING PLANTS

CROSS REFERENCE TO RELATED APPLICATIONS

This application claims priority under 35 § 119(e) of U.S. Provisional Application No. 62/349,822, filed on Jun. 14, 2016, entitled "Vertical Assembly for Growing Plants," the entire disclosure of which is hereby incorporated by reference.

This application claims priority under 35 U.S.C. § 120 of U.S. application Ser. No. 15/219,410, filed on Jul. 26, 2016, entitled "Vertical Assembly for Growing Plants," the disclosure of which is hereby incorporated by reference.

STATEMENT REGARDING FEDERALLY SPONSORED RESEARCH OR DEVELOPMENT

N/A.

BACKGROUND

The need for fresh food is growing as the population increases and changes in the climate impact growing seasons. The current food supply model, based on traditional farming methods and long distance shipping, is economically and environmentally unsustainable. Traditional farming operations are usually located in agricultural areas, which require large upfront costs and large acreage and have high operational costs from seed to sale.

Urban and local agriculture also face obstacles. Growing space in urban areas is limited and not sufficient to meet a high demand. High start-up and operating costs of greenhouses make local crop production difficult for many businesses. Structures intended to support rooftop greenhouses must be evaluated by structural engineers and often require additional bracing to support the weight. Urban gardens often must address contaminated soil. Hydroponic systems are not easily used in urban locales, as most hydroponic systems are meant to be installed in agricultural settings, are not easily transportable, and require extensive training of personnel for operation.

Contained agricultural systems have recently been developed to address these issues. For example, a growing system in a modular container, described in U.S. Pat. No. 9,288,948, has been developed for generating high-yield crops. Within the modular container, the growing system includes a germination station for nurturing seeds until they germinate into plants, a plurality of vertical racks to hold the growing plants, a lighting system to provide appropriate light for the plants, an irrigation system to provide nutrients to the plants, a climate control system to control the environmental conditions within the container, a ventilation system for providing airflow to the plants, and a monitoring system to monitor and control the components of the growing system.

SUMMARY OF THE INVENTION

The present invention provides a device for growing plants on a panel assembly that can be mounted vertically in any suitable space, such as a modular growing container. The panel assembly can achieve efficiencies, such as providing a higher density of plants in a given volume.

Other aspects of the method and system include the following:

1. A device for growing plants, comprising:
   a panel assembly comprising:
   a support panel having a front face and a back face;
   at least one nutrient flow channel supported on the back face of the support panel and providing a nutrient flow passage extending from an inlet at an upper region to an outlet at a lower region of the support panel;
   at least one grow pocket supported on the front face of the support panel, the grow pocket in alignment with the nutrient flow channel, the grow pocket having a plant access opening; and
   at least one fluid aperture in the support panel, the fluid aperture disposed at a lower region of the grow pocket for fluid communication between an interior of the grow pocket and the nutrient flow passage.

2. The device of item 1, further comprising a front panel fastened to the front face of the support panel to form the grow pocket, the grow pocket comprising a region within one or more bond lines fastening the front panel and the support panel together.

3. The device of item 2, wherein the one or more bond lines of the grow pocket are tapered from the plant access opening to a narrower closed bottom below the fluid aperture.

4. The device of any of items 2-3, wherein the plant access opening of the grow pocket comprises a first slit in the front panel extending across a top portion of the grow pocket and a second slit in the front panel extending orthogonally from the first slit toward the lower region of the grow pocket.

5. The device of item 4, wherein the plant access opening of the grow pocket further comprises a cut away region of the front panel below the first slit.

6. The device of any of items 1-3, wherein the plant access opening of the grow pocket opens toward a side of the panel assembly.

7. The device of any of items 1-6, further comprising a plurality of grow pockets oriented in a vertical column in linear alignment with the nutrient flow channel.

8. The device of any of items 1-7, further comprising a back panel fastened to the back face of the support panel along bond lines to form the nutrient flow channel, the nutrient flow channel extending from an upper inlet to a lower outlet and traversing the fluid aperture at the grow pocket.

9. The device of item 8, wherein the nutrient flow passage comprises a region between two bond lines fastening the back panel and the support panel together, the two bond lines extending from the upper inlet to the lower outlet.

10. The device of item 9, wherein the two bond lines are tapered toward the lower outlet.

11. The device of any of items 8-10, wherein the support panel and the back panel are bonded together along bond lines angled at locations to direct a nutrient solution in the nutrient flow channel to the fluid aperture in the support panel.

12. The device of any of items 1-11, wherein the panel assembly further comprises a plurality of nutrient flow channels disposed in parallel columns, and a plurality of grow pockets in linear alignment with each of the columns of the nutrient flow channels.

13. The device of any of items 1-12, further comprising:
   a back panel fastened to the support panel along bond lines that form the nutrient flow channel; and
   a front panel fastened to the support panel along one or more bond lines that form a plurality of grow pockets in linear alignment with the nutrient flow channel, each grow pocket comprising a region within the one or more bond lines.
14. The device of item 13, further comprising a plurality of nutrient flow channels disposed in parallel columns, and a plurality of grow pockets in linear alignment with each of the columns of the nutrient flow channels, and wherein each of the nutrient flow channels and the plurality of grow pockets in linear alignment therewith are formed by an additional front panel, an additional back panel, and an additional support panel fastened along adjacent longitudinal edges to the front panel, the back panel, and the support panel.
15. The device of any of items 13-14, wherein the back panel, the support panel, and the front panel are fastened together along bond lines with radio frequency welding, ultrasonic welding, heat sealing, an adhesive, mechanical fasteners, or stitching.
16. The device of any of items 13-15, wherein each of the front panel, the back panel, and the support panel comprises a flexible sheet.
17. The device of item 16, wherein the flexible sheet comprises polyvinyl chloride, polyethylene, or polypropylene.
18. The device of item 16, wherein the flexible sheet comprises a textile material, a fibrous material, a foam material, a composite material, or a laminate of two or more materials.
19. The device of item 16, wherein the flexible sheet comprises a woven material, a non-woven, material, a knit material, or a braided material.
20. The device of any of items 16-19, wherein the flexible sheet is a waterproof material, or includes a water proof coating.
21. The device of any of items 13-20, wherein each of the front panel, the back panel, and the support panel comprises a semi-rigid material or a self-supporting material.
22. The device of any of items 1-24, further comprising an inlet fixture attached to the inlet of the nutrient flow channel.
23. The device of any of items 1-22, further comprising an outlet fixture attached to the outlet of the nutrient flow channel.
24. The device of any of items 1-23, wherein the panel assembly further comprises a plurality of nutrient flow channels disposed in parallel columns, and a plurality of grow pockets in linear alignment with each of the columns of the nutrient flow channels.
25. The device of item 24, further comprising a manifold along the upper region of the panel assembly to distribute a nutrient solution from a nutrient solution source to each of the nutrient flow channels.
26. The device of any of items 24-25, wherein the nutrient flow channels and the plurality of grow pockets in linear alignment therewith are formed by an additional front panel, an additional back panel, and an additional support panel fastened along adjacent longitudinal edges to the front panel, the back panel, and the support panel.
27. The device of any of items 24-26, wherein the panel assembly includes stiffening elements extending generally parallel to the nutrient flow channels at one or more intermediate locations of the support panel to provide stiffening or structural support to the panel assembly.
28. The device of any of items 24-27, wherein the panel assembly includes inflatable channels extending generally parallel to the nutrient flow channels at one or more intermediate locations of the support panel to provide stiffening or structural support to the panel assembly.
29. The device of any of items 1-28, wherein the panel assembly is oriented to allow a nutrient fluid in the nutrient flow channel to flow from the inlet to the outlet.
30. The device of any of items 1-29, wherein the panel assembly is oriented vertically.
31. The device of any of items 1-30, further comprising a suspension assembly to suspend the panel assembly in a vertical orientation.
32. The device of item 31, wherein the suspension assembly includes a plurality of openings along an upper edge of the panel assembly.
33. The device of any of items 31-32, wherein the suspension assembly includes a plurality of hooks along an upper edge of the panel assembly.
34. The device of any of items 1-33, further comprising one or more structural stiffening elements extending parallel to at least a portion of a length of the nutrient flow channel.
35. The device of item 34, wherein the structural stiffening element comprises a rib, a rod, or an air-filled channel.
36. The device of any of items 1-35, further comprising a rib extending parallel to at least a portion of a length of the nutrient flow channel.
37. The device of any of items 1-36, wherein the panel assembly includes stiffening elements extending along edges of the support panel.
38. The device of any of items 1-37, wherein the panel assembly includes inflatable channels along edges of the support panel to provide stiffening or structural support.
39. A system for growing plants, comprising:
the device of any of items 1-38;
a nutrient reservoir;
and an inlet flow channel from the nutrient reservoir to the inlet of the nutrient flow channel.
40. The system of item 39, further comprising an outlet flow channel from the outlet of the nutrient flow channel.
41. The system of any of items 39-40, further comprising a growth medium disposed within one or more of the plurality of grow pockets.
42. The system of item 41, further comprising a plant or a seed disposed within the growth medium.
43. A method of manufacturing the device of any of items 1-42, comprising:
providing three flexible sheets comprising a front sheet, a back sheet, and a support sheet;
forming the plant access opening for the grow pocket in the front sheet;
forming the fluid aperture in the support sheet;
fastening the front sheet and the support sheet together along one or more bond lines to form the grow pocket; and
fastening the back sheet to the support sheet and the front sheet along bond lines to form the nutrient flow channel and attach the three flexible sheets together to form the panel assembly.
44. The method of item 43, further comprising bonding the three flexible sheets together at one or more angular lines adjacent the lower region of each grow pocket.
45. The method of any of items 43-44, further comprising attaching an inlet fixture to the inlet of the nutrient flow channel and attaching an outlet fixture to the outlet of the nutrient flow channel.
46. The method of any of items 43-45, further comprising forming openings for a suspension assembly along an upper edge of the panel assembly.

47. A method of growing plants, comprising:
    providing the device for growing plants of any of items 1-42;
    disposing a growth medium and a plant or a seed in the grow pocket; and
    connecting a nutrient fluid for fluid flow to the inlet of the nutrient flow channel.
48. The method of item 47, further comprising suspending the device for growing plants in a vertical orientation.
49. The method of any of items 47-48, further comprising locating the device for growing plants in an indoor, climate-controlled environment.
50. A device for growing plants, comprising:
    a panel assembly comprising a front panel, a back panel, and a support panel;
    the back panel and the support panel fastened together to form a plurality of nutrient flow channels, each nutrient flow channel extending from an inlet to an outlet; and
    the front panel and the support panel fastened together to form a plurality of grow pockets in linear alignment with each nutrient flow channel, each grow pocket including a plant access opening through the front panel at an upper region of the grow pocket, and a fluid aperture formed in the support panel at a lower region of the grow pocket for fluid communication with the nutrient flow channel.
51. The device of item 50, wherein each grow pocket comprises a region within one or more bond lines fastening the front panel and the support panel together.
52. The device of item 51, wherein the one or more bond lines of each grow pocket are tapered from the plant access opening to a narrower closed bottom below the fluid aperture.
53. The device of any of items 50-52, wherein the plant access opening of each grow pocket comprises a first slit in the front panel extending across a top portion of the grow pocket and a second slit in the front panel extending orthogonally from the first slit toward the lower region of the grow pocket.
54. The device of item 53, wherein the plant access opening of each grow pocket further comprises a cut away region of the front panel below the first slit.
55. The device of any of items 50-54, wherein the grow pockets are oriented in one or more vertical columns.
56. The device of any of items 50-55, wherein the nutrient flow channel comprises a region between two bond lines fastening the back panel and the support panel together, the two bond lines extending from the upper inlet to the lower outlet.
57. The device of item 56, wherein the two bond lines are tapered toward the lower outlet.

DESCRIPTION OF THE DRAWINGS

The invention will be more fully understood from the following detailed description taken in conjunction with the accompanying drawings in which.

DETAILED DESCRIPTION OF THE INVENTION

Figure 1:
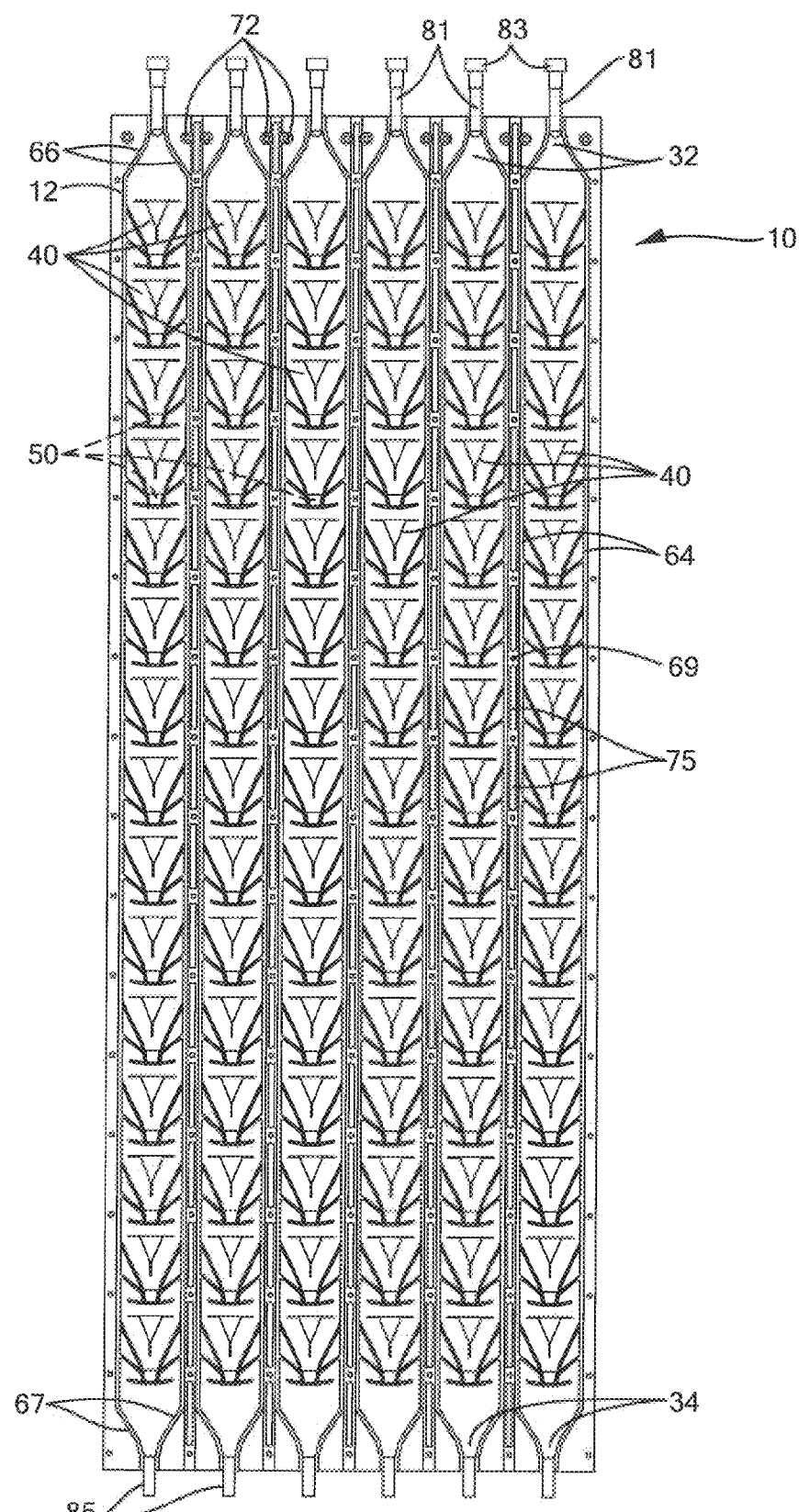
FIG. 1 is a front plan view of an embodiment of a device for growing plants.
Figure 2:
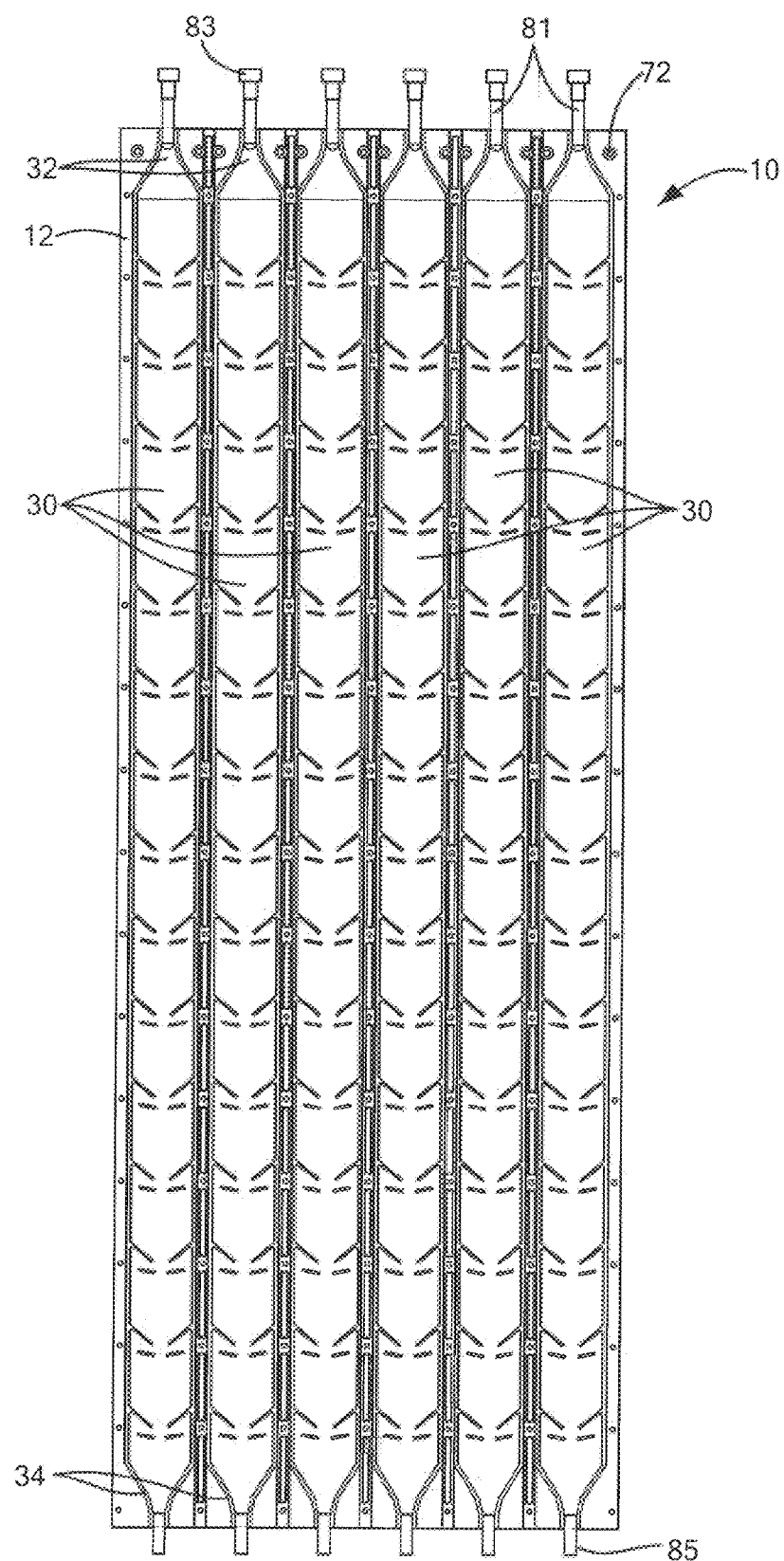
FIG. 2 is a rear plan view of the device for growing plants of FIG. 1.
Figure 3:
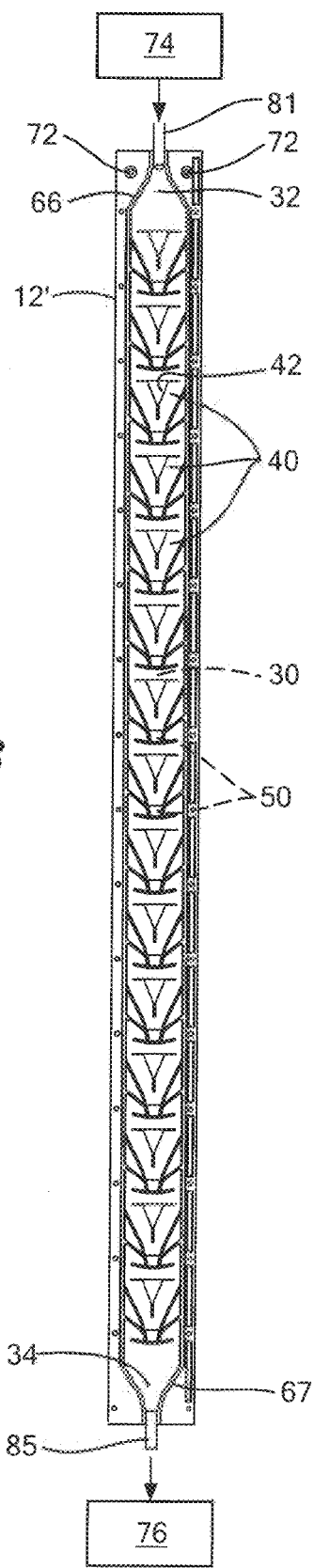
FIG. 3 is a front plan view of a further embodiment of a device for growing plants.
Figure 4:
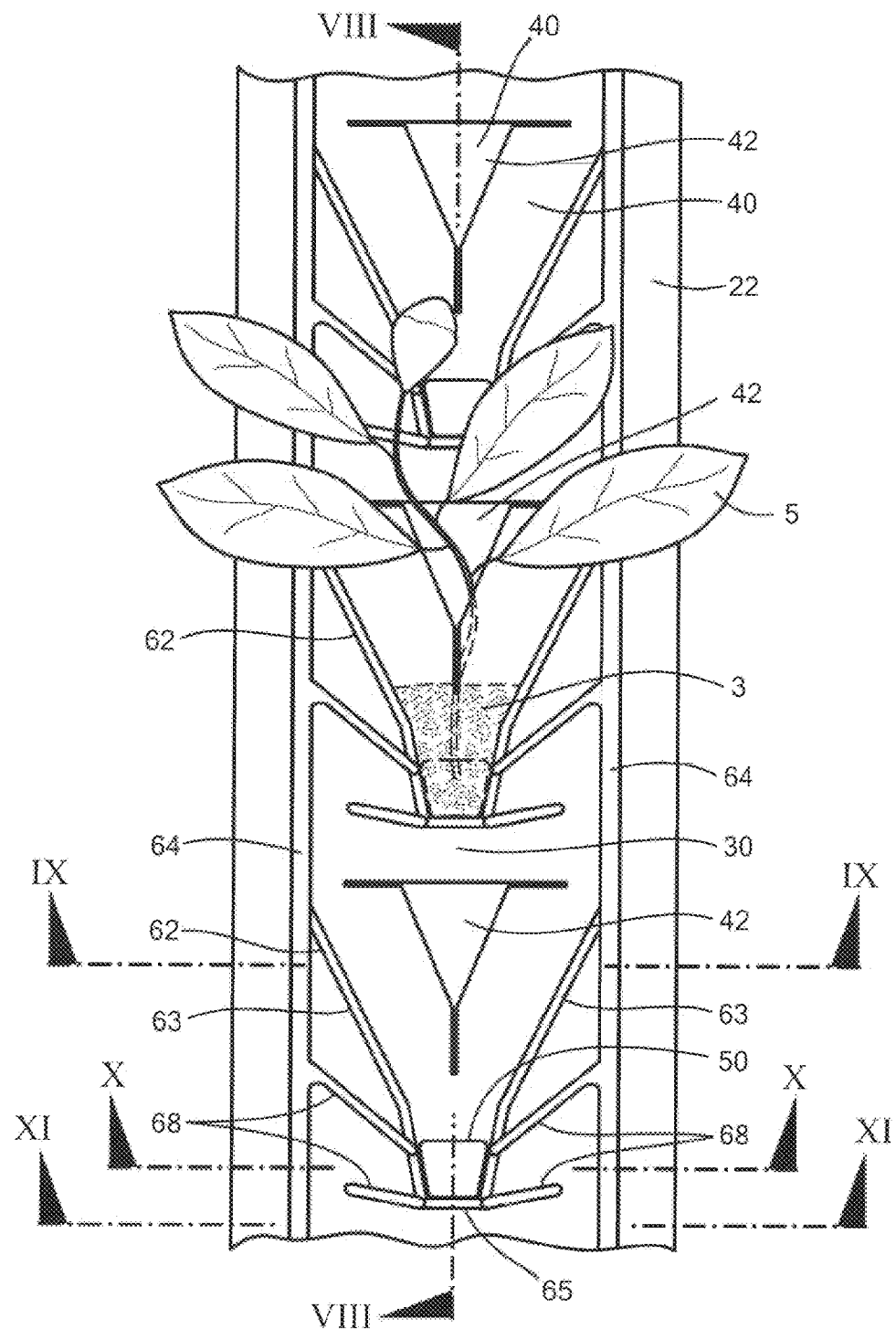
FIG. 4 is a partial front plan view of the device of FIG. 3 including one growing plant.
Figure 5:
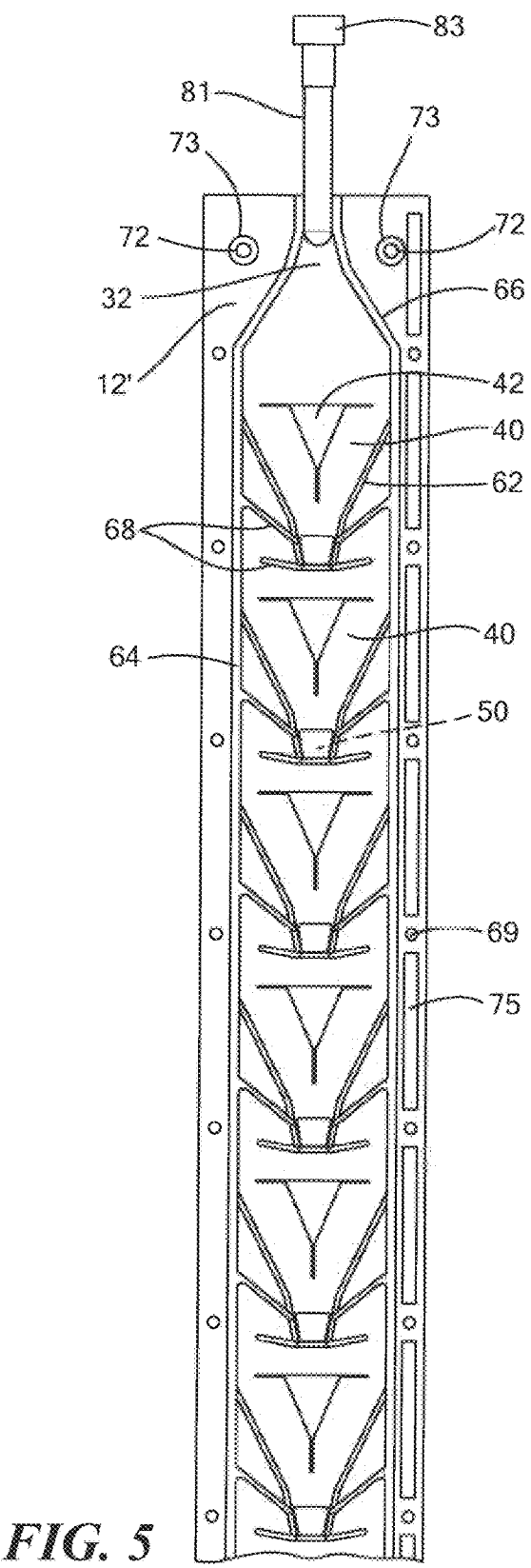
FIG. 5 is a further front partial plan view of the device of FIG. 3.
Figure 6:
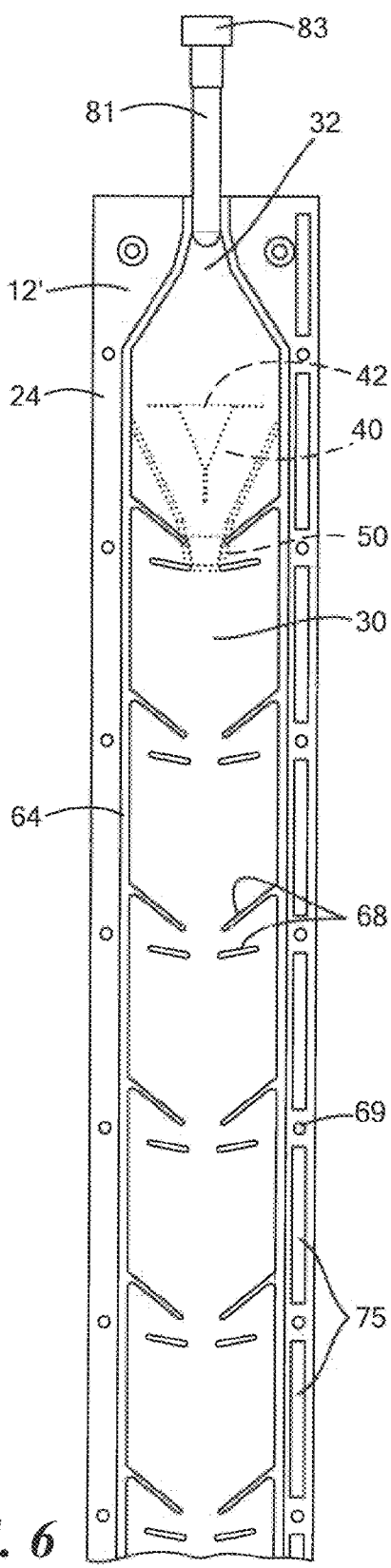
FIG. 6 is a partial rear plan view of the device of FIG. 3.
Figure 7:
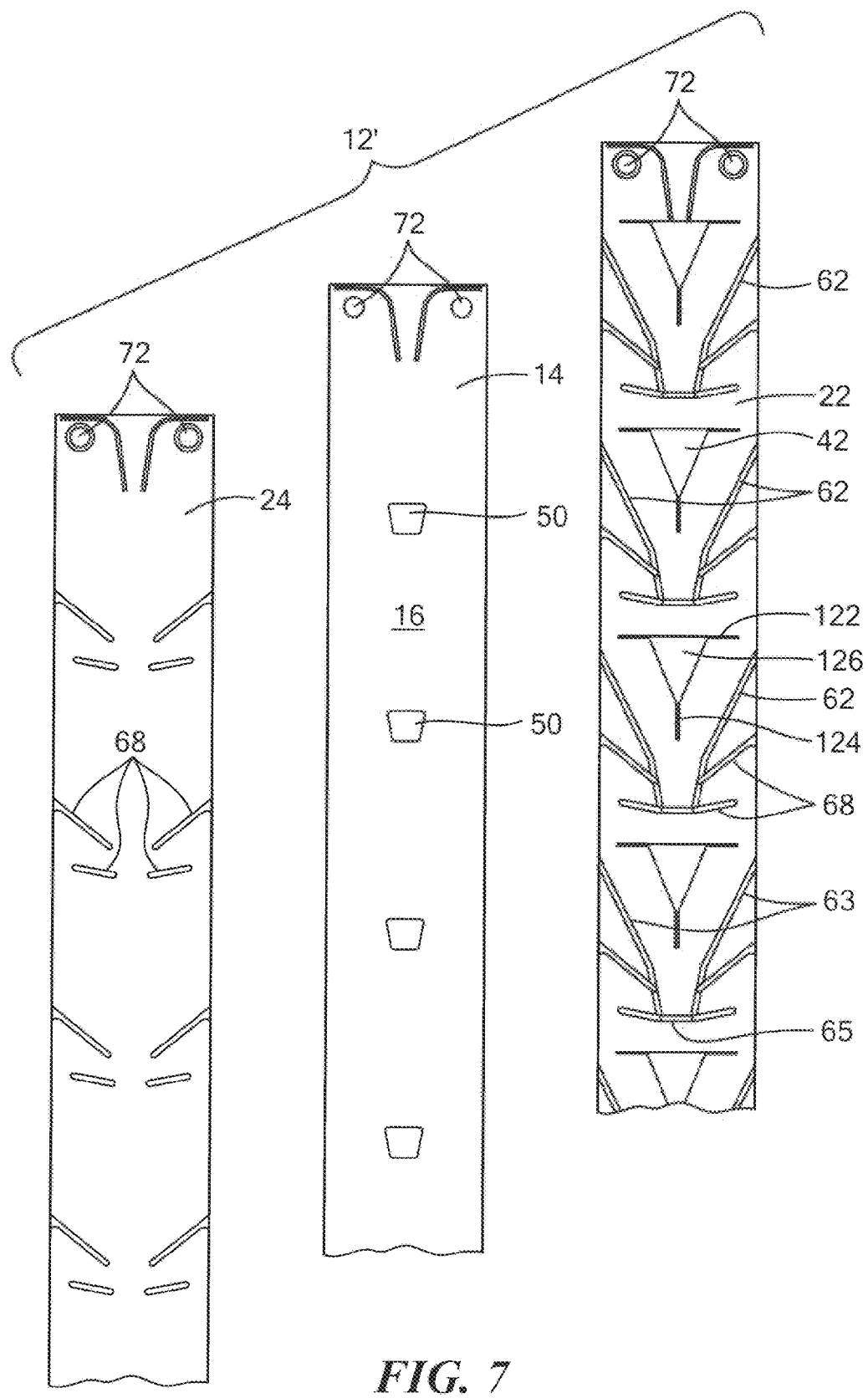
FIG. 7 is an exploded view of the device of FIG. 3.
Figure 8:
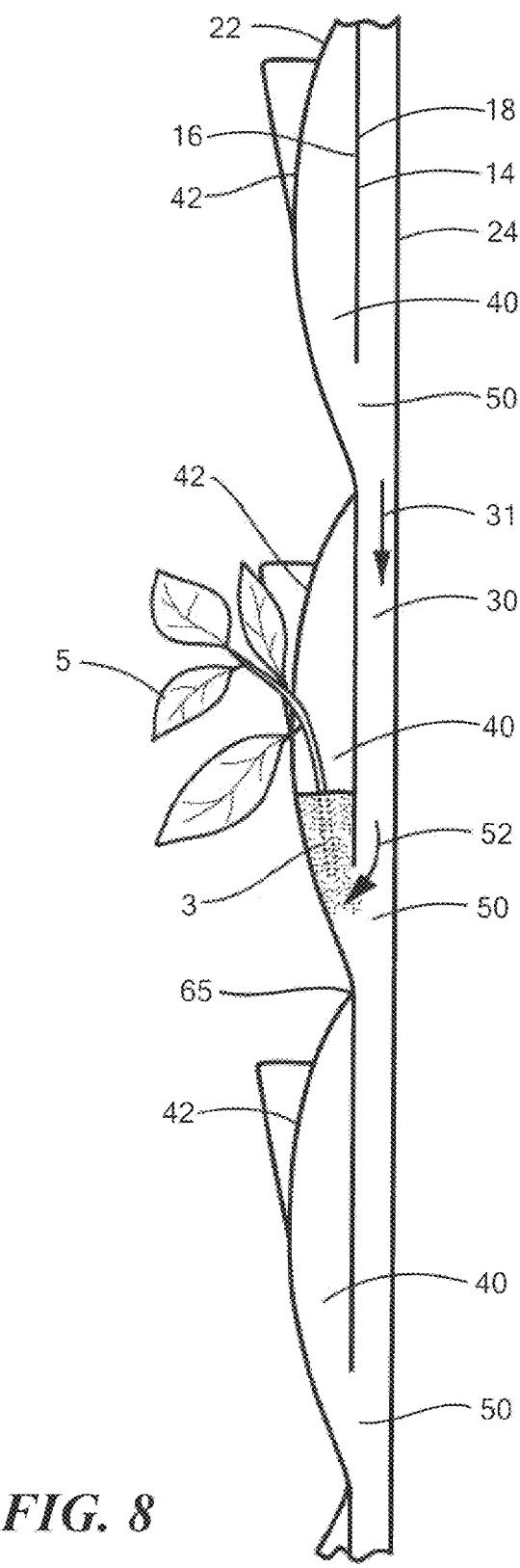
FIG. 8 is a cross-sectional view along line VIII-VIII of FIG. 4.
Figure 9:
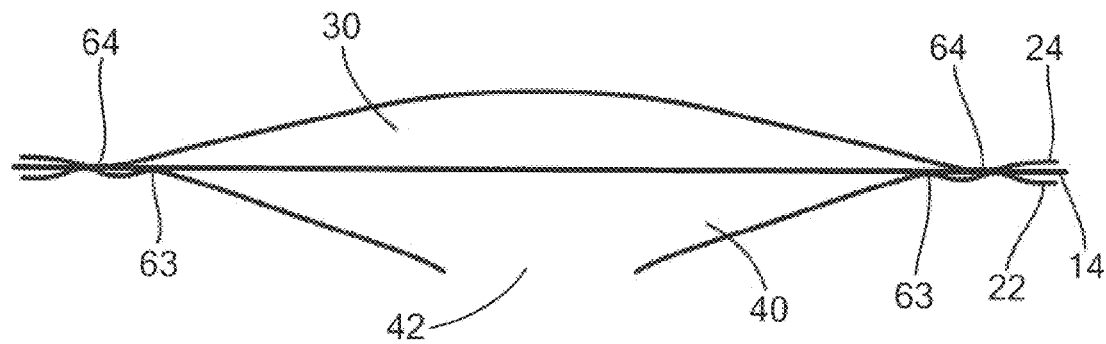
FIG. 9 is a cross-sectional view along line IX-IX of FIG. 4.
Figure 10:
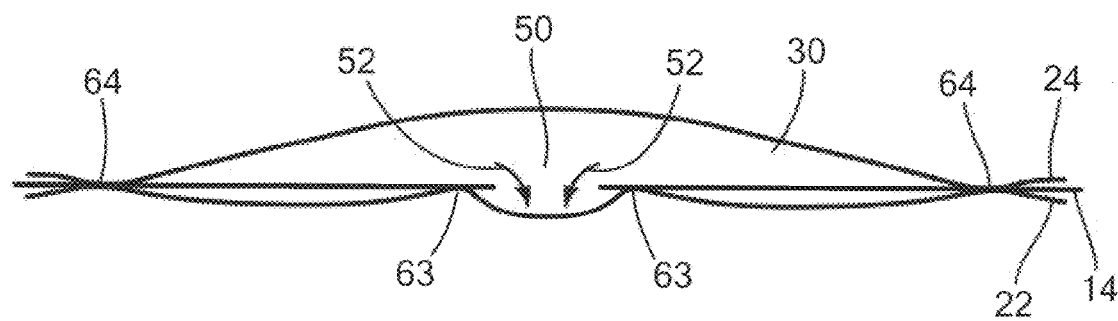
FIG. 10 is a cross-sectional view along line X-X of FIG. 4.
Figure 11:
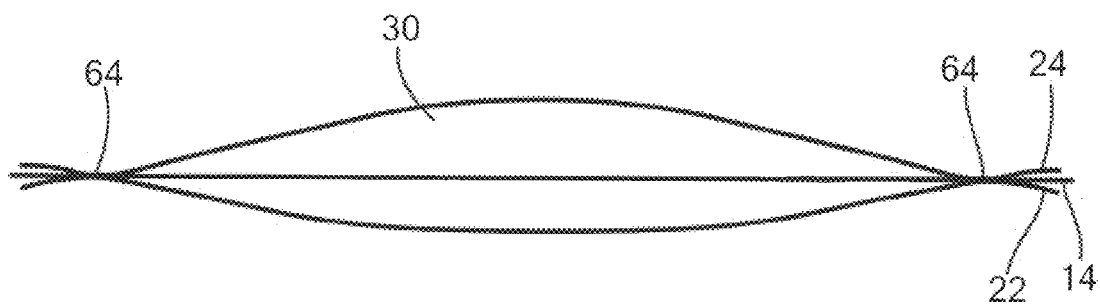
FIG. 11 is a cross-sectional view along line XI-XI of FIG. 4.

An embodiment of a device 10 for growing plants is illustrated in FIGS. 1-2. The device 10 includes a panel assembly 12 providing one or more grow pockets 40 on one side of the device in linear alignment with one or a plurality of nutrient flow channels 30 on an opposite side of the device. Each nutrient flow channel extends from an inlet 32 to an outlet 34 and is in fluid communication with the one or more grow pockets via fluid apertures 50 through a support panel. The device illustrated in FIG. 1 includes six columns of fifteen grow pockets in linear alignment with six nutrient flow channels. It will be appreciated, however, that any number of grow pockets and any number of nutrient flow channels can be provided, depending on the application and the space available.

In the embodiment shown, the panel assembly 12 is formed from a number of discrete panel assemblies 12' that are attachable along vertical edges. Each panel assembly 12' provides a single column of vertically aligned grow pockets on one side and a single nutrient channel on the opposite side. In this manner, any desired number of discrete panel assemblies 12' can be produced and attached together. It will be appreciated that the panel assembly 12 can also be formed as a unitary or integral panel assembly with multiple columns of grow pockets and multiple nutrient channels, described further below.

FIGS. 3-11 illustrate with more particularity an embodiment of a panel assembly 12' with a single column of grow pockets. The panel assembly 12' includes a support panel 14 having a front face 16 and a back face 18. A nutrient flow channel 30 is supported on the back face of the support panel, and one or more grow pockets 40 are supported on the front face of the support panel in linear alignment with the nutrient flow channel. The nutrient flow channel is in fluid communication with the one or more grow pockets 40 on the front face of the support panel via fluid apertures 50 through the support panel 14.

Each grow pocket 40 includes a plant access opening 42 at an upper region of the grow pocket. A growing medium 3 can be placed in each grow pocket, and a seed or plant 5 can be placed in the growing medium. See FIGS. 4 and 8. A plant nutrient solution can be fed through the nutrient flow channel 30 from the fluid inlet 32 at an upper region of the panel assembly to the fluid outlet 34 at a lower region of the panel assembly. The nutrient solution flows downwardly indicted by arrow 31 in FIG. 8. As the nutrient solution flows past the fluid apertures 50 in the support panel, an amount of the nutrient solution also flows through the fluid apertures 50 into the growing medium in each grow pocket 40 (indicated by arrows 52 in FIGS. 8 and 10), thereby keeping the growing medium moist and the growing plant 5 nourished.

In some embodiments, the panel assembly 12 includes a front panel 22 and a back panel 24 fastened to the support panel 14 in a layered arrangement (see FIGS. 7-11) along bond lines that form the grow pockets 40 and the nutrient flow channels 30. In particular, bond lines 62 between the support panel 14 and the front panel 22 define an outline of each grow pocket. In the embodiment shown, the bond lines 62 are generally tapered downwardly along each side 63 to a closed bottom 65 below the fluid aperture 50. Bond lines 64 between the support panel 14 and the back panel 24 define each nutrient flow channel. Bond lines 68 between the support panel 14 and the back panel 24 can be provided to define baffles to direct fluid flow toward the fluid apertures 50. In this way, no or minimal nutrient solution bypasses the fluid apertures, thereby preventing or minimizing waste of the nutrient solution. For ease of manufacture and to strengthen the panel assembly, the bond lines between the back panel and the support panel can also bond to the front panel, as described further below; however, it will be appreciated that the back panel does not need to be bonded to the front panel to provide elements such as the nutrient flow channels, fluid inlets, fluid outlets and baffles.

The fluid inlets 32 can be connected to a liquid nutrient solution source 74, which can be fed into each nutrient flow channel 30 for flow downwardly between the lines 64 to the fluid outlets 34 at or near the bottom of the support panel 12. The outlets can be connected to a collection reservoir 76 for the nutrient solution. Tapered bond lines 66 can be provided to direct flow from the inlet 32 into the channel 30, and tapered bond lines 67 can be provided to direct flow from the channel 30 to the outlet 34.

The panel assembly can include any suitable mounting fixtures to mount the assembly in a vertical orientation. In some embodiments, the device can be suspended in a vertical orientation from an overhead fixture. In some embodiments, the device can include openings 72 along the upper edge. The openings can be reinforced with grommets 73. Hooks or other suitable suspension elements can be placed through the openings and suspended from an overhead bar or another form of support element. It will be appreciated that many other suspension mechanisms can be provided.

Figure 13:
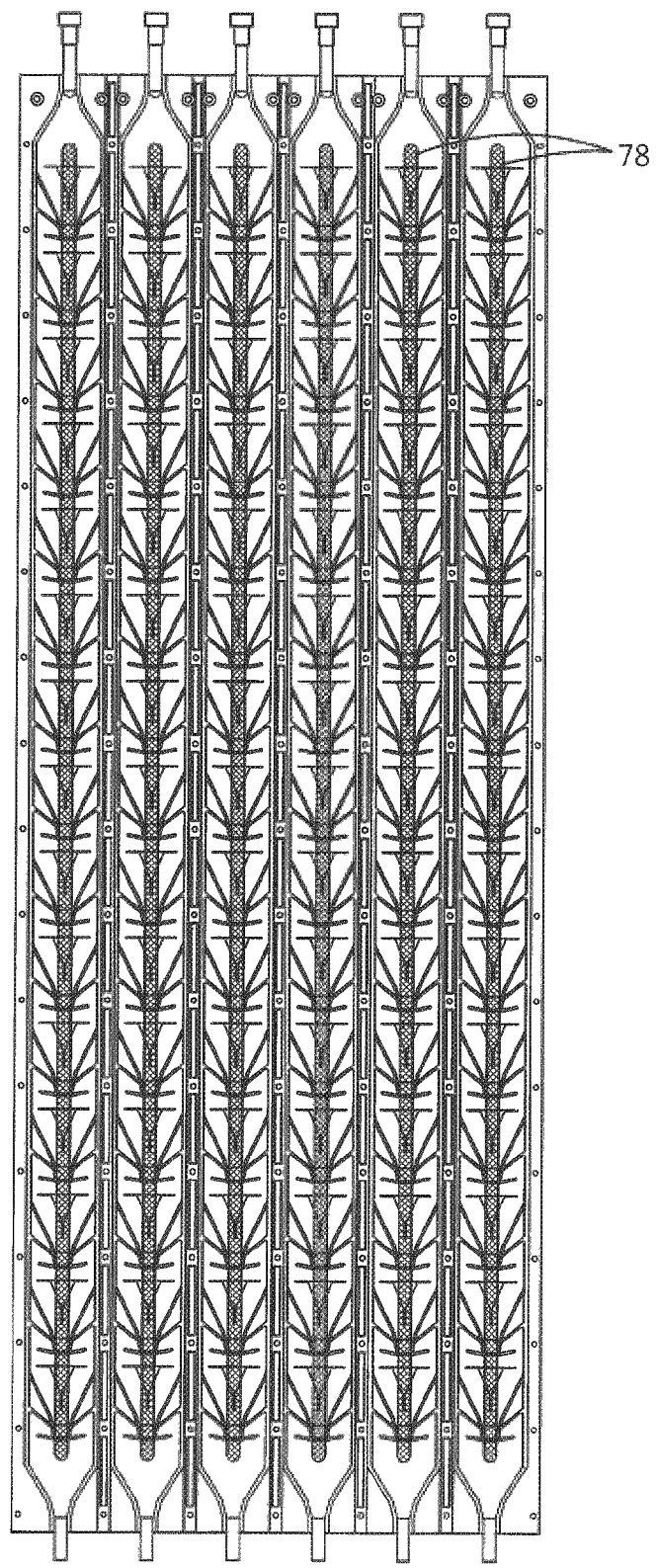
FIG. 13 is a front plan view of a further embodiment of a device for growing plants incorporating ribs.
Figure 14:
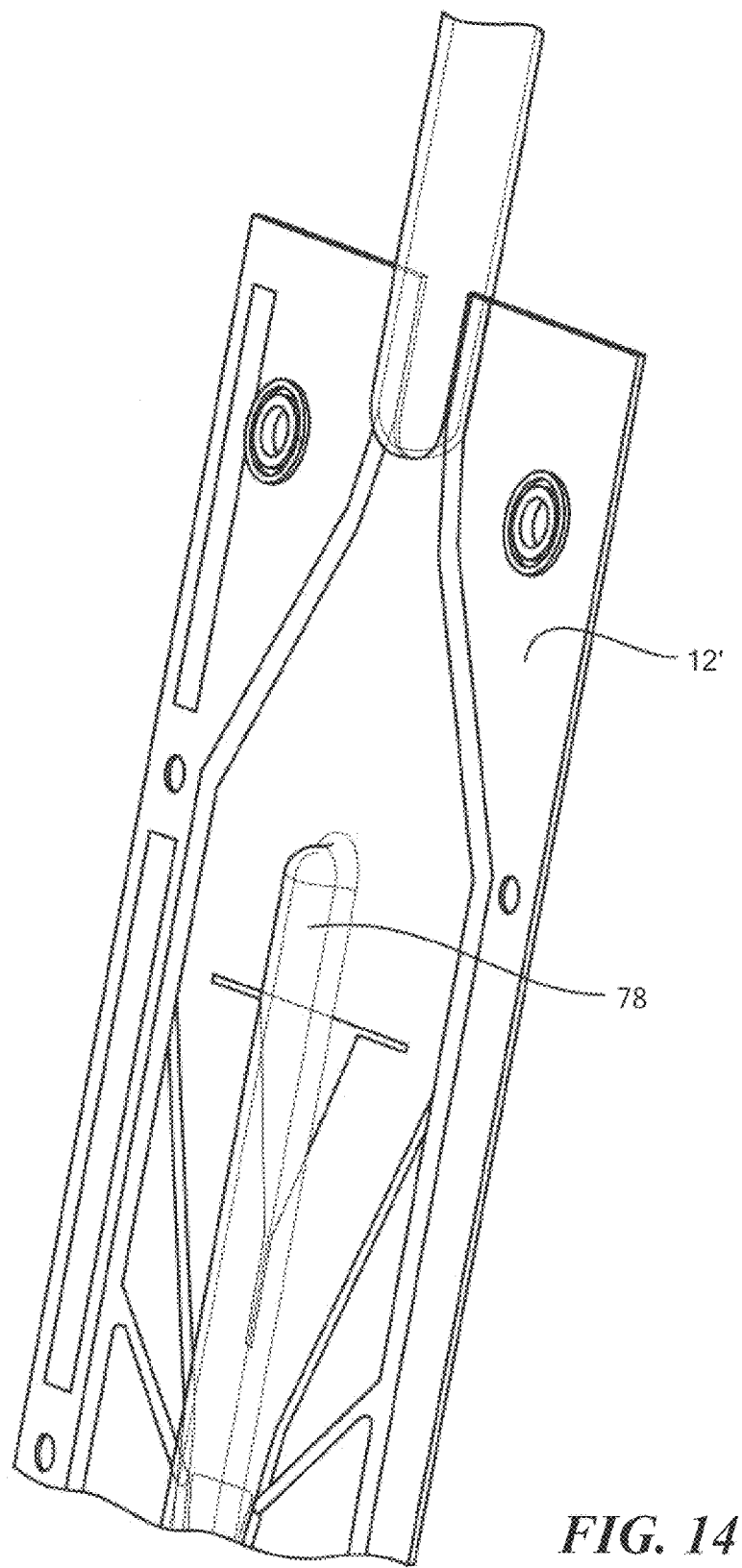
FIG. 14 is a partial isometric view of the device of FIG. 13.
Figure 15:
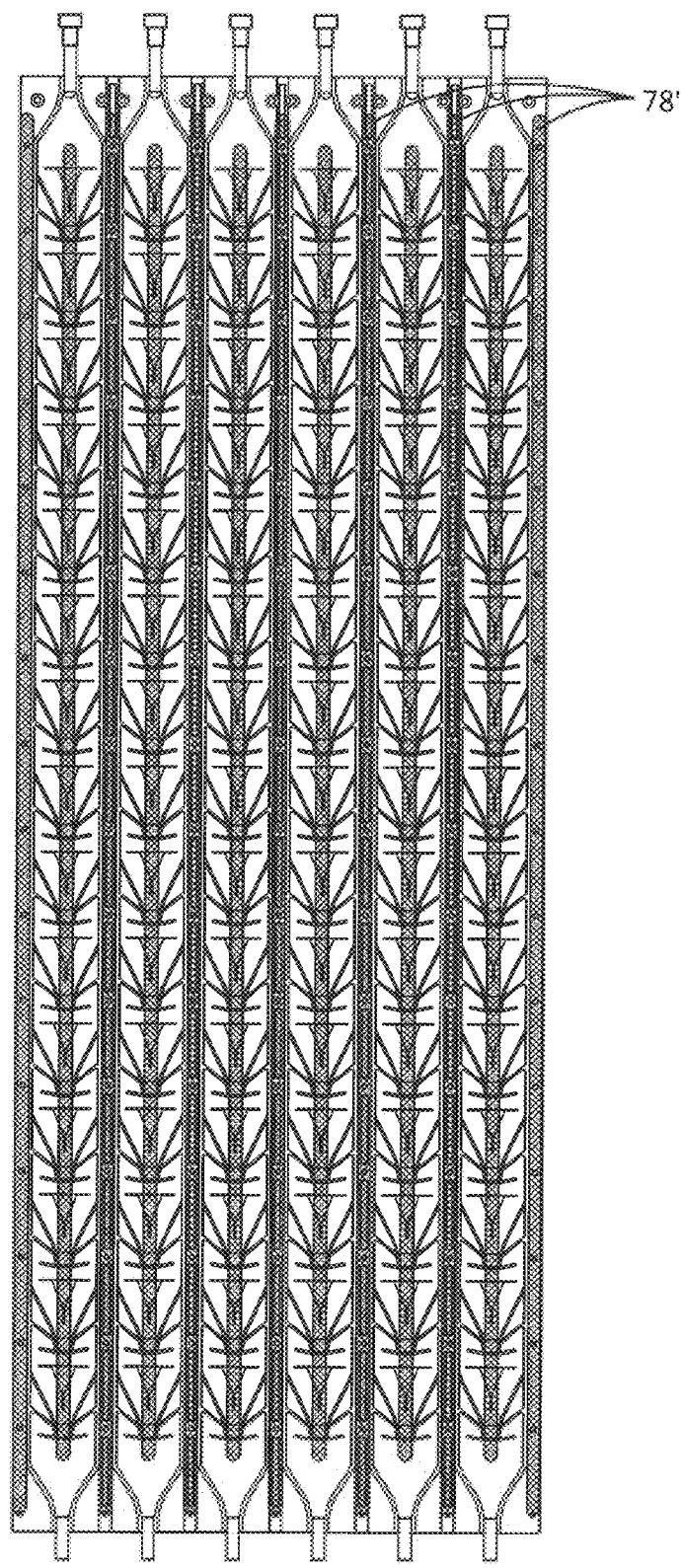
FIG. 15 is front plan view of a further embodiment of a device for growing plants incorporating stiffening ribs.
Figure 16:
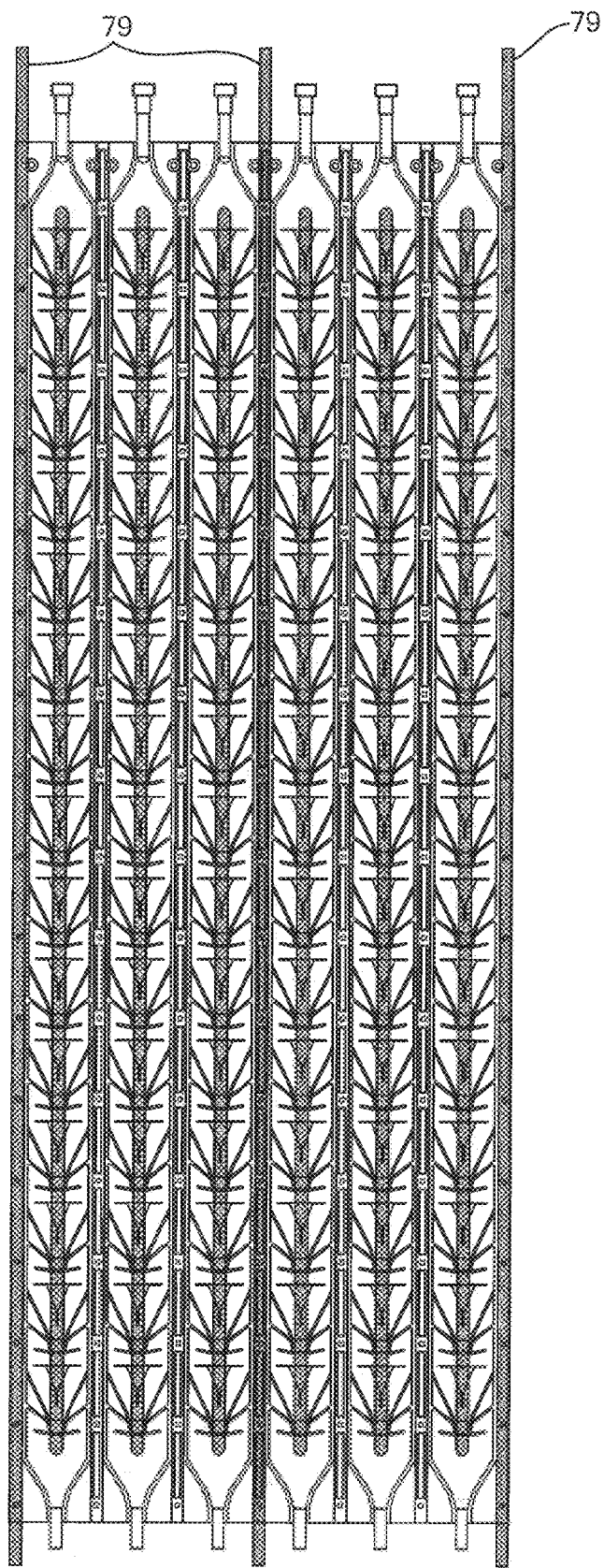
FIG. 16 is a front plant view of a further embodiment of a device for growing plants incorporating supports for mounting on a stand.

In some embodiments, the panel assembly can include additional structural elements to provide stiffening and/or to assist the panel assembly in remaining in an upright or vertical orientation. FIGS. 13 and 14 illustrate an embodiment in which a rib 78 is disposed adjacent and parallel to a nutrient flow channel, for example, by welding or inserting in an elongated pocket formed adjacent to the flow channel. In some embodiments, the vertical edges of discrete panel assemblies 12' can be configured to provide structural support for a panel assembly when fastened together. FIG. 15 illustrates an embodiment in which ribs 78' are attached between and/or alongside panel assemblies to form stiffening elements. The ribs can be, for example, plastic, metal, or composite material rods. In some embodiments, flexible fiberglass or other rods can be used. In some embodiments, the panel assembly can be mounted on a stand supported on a floor. FIG. 16 illustrates an embodiment in which supporting rods 79 are attached in any suitable manner at several locations to the panel assembly to form mounting points. Each rod can be placed in a support fixture at a lower end and/or attached to a support fixture at an upper end. In some embodiments, the vertical edges of one or more panel assemblies can include inflatable channels that upon inflation with air or another fluid can be used to provide stiffening and/or structural support.

In some embodiments, separate input conduits 81 can be provided at the top of the panel assembly for connection to each inlet 32 of the nutrient flow channels 30. See FIGS. 1-3. Fittings 83 can be affixed to the input conduits for connection to an input manifold or to one or more input conduits from a nutrient solution source 74. A separate output conduit 85 can be provided at the bottom of the panel assembly for connection to each outlet 34 of the nutrient flow channels 30. The output conduit can drain to a collection reservoir 76.

Figure 12:
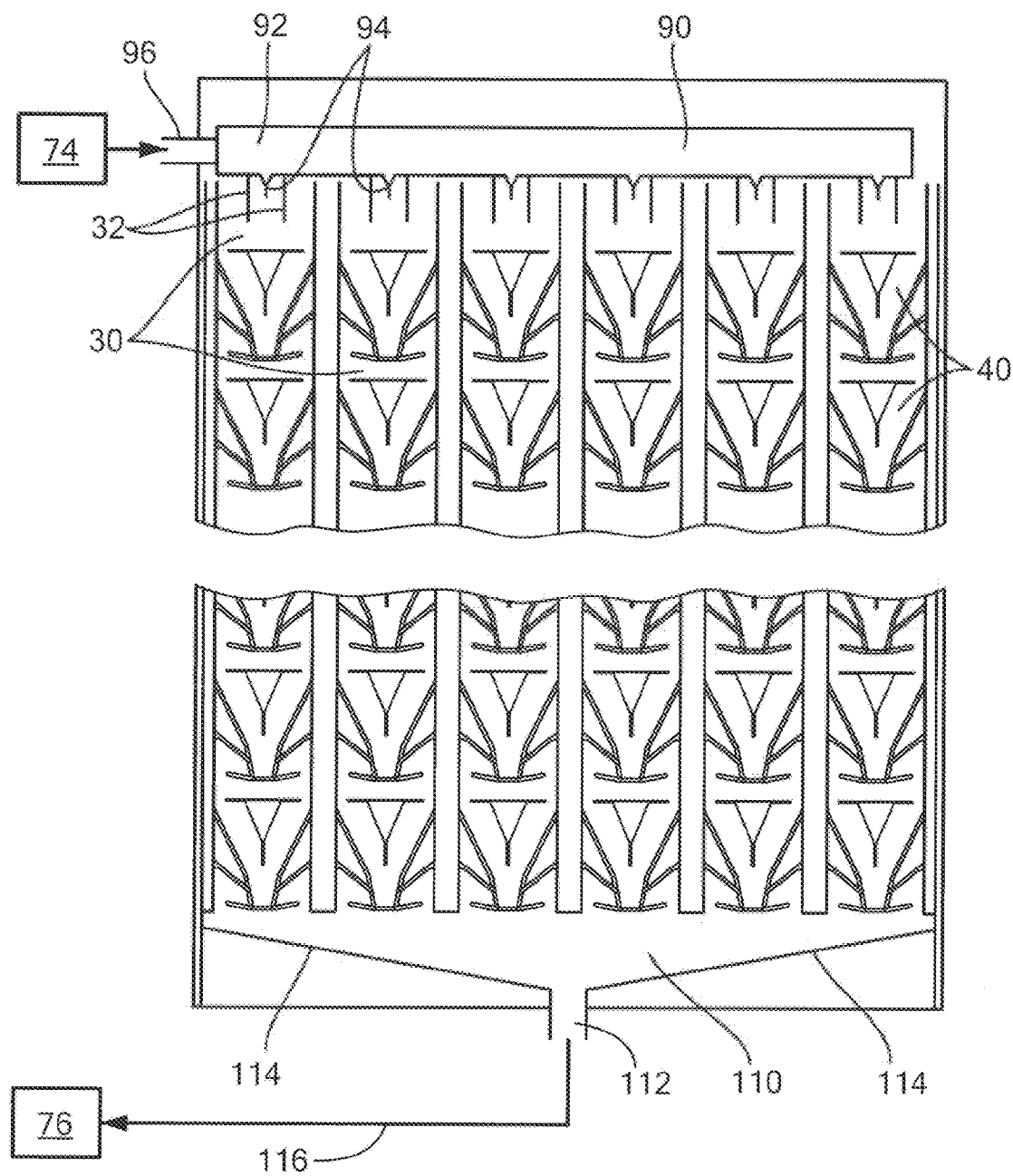
FIG. 12 is a front plan view of a further embodiment of a device for growing plants.

In some embodiments, an input manifold 90 can be located at the top of the panel assembly to receive the nutrient solution from a nutrient solution source and distribute it to each of the nutrient flow channels 30. See FIG. 12. In some embodiments, a manifold can be formed as a separate element that can be retained between the support panel and the back panel, for example, with or between bond lines between the back panel and the support panel. For example, the manifold can be formed from two sheets of material bonded together along a perimeter to define the manifold. The manifold can include an inlet 92 and a plurality of outlets 94, each outlet aligned with an inlet 32 of a nutrient flow channel 30. An input conduit 96 can be fixed to the inlet of the manifold, for example, by mandrel welding.

In some embodiments, a collection manifold 110 can be located at the bottom of the panel assembly to direct an outflow of the nutrient solution to a discharge outlet 112 at the bottom of the panel. See FIG. 12. The collection manifold can be formed by bond lines 114 angled to direct the nutrient solution toward the outlet 112.

In some embodiments, the collection reservoir 76 can be located beneath the panel assembly, and nutrient solution can drain directly down into the collection reservoir. See FIG. 3. In some embodiments, the collection reservoir can be located at a distance from the panel assembly and can be connected to the panel assembly via any suitable conduit 116. See FIG. 12.

In some embodiments, each of the support panel 14, the front panel 22, and the back panel 24 can be provided as a sheet or film of a flexible material. The sheets for the panels are generally the same height. The back panel can be slightly wider than the support panel so that after bonding each nutrient flow channel has some slack to provide depth to each fluid flow passage and allow room for root growth. The sheet material can be in any suitable thickness. In some embodiments, the sheets are 6-10 mils (0.006-0.010 inch) in thickness. The sheet material can be any suitable material, such as, without limitation, polyvinyl chloride, polyethylene, or polypropylene. The material is waterproof to retain the nutrient solution in the nutrient flow channels and the grow pockets. In some embodiments, the sheet can be a semi-rigid polymer material or a fibrous material. In some embodiments, the sheet can have some rigidity or stiffness or can be formed to be self-supporting or self-standing. In some embodiments, the sheet can also be a laminate of two or more materials. In some embodiments, a waterproof liner can be bonded to a different material that provides strength. In some embodiments, one or more sheets can be formed from a composite material, such as a fiberglass composite material. In some embodiments, one or more of the sheets can be a fibrous material or a textile, such as a woven, non-woven, knit or braided material. In some material, one or more of the sheets can be a foam material. The sheets can be made from recycled materials. One or more of the sheets can include a water proof coating on at least those surfaces that come in contact with the nutrient solution. The material can be opaque, or the material can be transparent or translucent to allow visual inspection into the grow pockets and the nutrient flow channels. An opaque material for at least the grow pockets can be beneficial for root growth.

The device can be manufactured in any suitable manner. In one embodiment, each of the support panel 14, the front panel 22, and the back panel 26 is provided as an appropriate sheet material cut to a desired height and width. The access openings 42 for each grow pocket are cut into the front panel. In the embodiment shown, the cuts for each pocket include a first slit 122 extending horizontally and a second slit 124 extending orthogonally downwardly from the first slit. The access opening can be further widened, for example, by removing a triangular portion 126 of the sheet material adjacent the slits, thereby providing increased access to the grow pocket. See FIG. 7. The fluid apertures 50 are cut into the support panel 14 for alignment with the lower regions of the grow pockets. In some embodiments, openings 72 near upper edges of each of the panels can be cut to receive appropriate fixtures for mounting the panel assembly in a growing environment, such as a modular growing container. Any suitable cutting mechanism or technique can be used, such as die cutting, laser cutting, water jet cutting, stamping, or the like.

After the panels have been appropriately cut, the support panel 14 and the front panel 22 are overlaid with the slits and cut out portions in appropriate alignment. The support panel and the front panel are bonded together along lines 62 defining an outline of each grow pocket 40. The grow pocket can be bonded with some slack to provide room for root growth within the growing medium. The bonded support panel and front panel form a subassembly. The back panel 24 is then overlaid on the subassembly adjacent to the support panel. The back panel and subassembly are bonded together along bond lines that join all three panels together. The nutrient flow channels 30 are formed by bond lines 64 extending from a region near the upper edge of the panels to a region near the lower edge. The bond lines 64 are arranged so that each column of grow pockets 40 is aligned between two bond lines 64 that define a nutrient flow channel 30. As noted above, the back panel can be bonded to the subassembly with a small amount of slack in each nutrient flow channel to provide a depth dimension to the flow channel. Angled bond lines 66 can be formed at the inlet 32, and angled bond lines 67 can be formed at the outlet 34. The baffles can be formed by one or two pairs of angular bond lines 68 within the nutrient flow channel adjacent to the lower region of each grow pocket to direct the flow of a nutrient solution in the nutrient flow passage toward the fluid aperture at the base of each grow pocket.

In some embodiments, discrete panel assemblies can be attached via bond lines 75 along their vertical edges to form a larger panel assembly. See FIGS. 1 and 2. The bond lines can be discontinuous to avoid apertures 69 that can be formed along the vertical edges to support the panels in the equipment during the manufacturing process.

In some embodiments, bond lines 114 can be formed to define the collection manifold 112 at the bottom of the device. In some embodiments, the input manifold 90 can be formed from a suitable material and retained within the panel assembly, between the support panel and the back panel, by suitable bond lines at the top of the panel assembly. See FIG. 12.

To form any of the bond lines, any suitable bonding mechanism or technique can be used, such as, without limitation, radio frequency welding, ultrasonic welding, heat sealing, adhesive bonding, mechanical fasteners, or stitching. If necessary, such as with bond lines formed by mechanical fasteners or stitching, additional water proofing or seam sealing can be applied along the bond lines. Input and output conduits can be affixed to the panel assembly in any suitable manner. In some embodiments, conduits can be affixed by welding, such as mandrel welding, or with mechanical fasteners, such as barbs, or with a combination thereof.

Any number of grow pockets can be provided on a panel assembly. Each column can contain any desired number of grow pockets, and any desired number of columns of grow pockets can be provided. The particular number and spacing of grow pockets can depend on factors such as space constraints within a modular container, the desired crops, and the desired crop density. In some embodiments, a single grow pocket can be provided. Similarly, the size of each grow pocket can be selected for the desired crop and crop density. In some embodiments, each grow pocket is sized to contain at least about 100 mm$^3$ of a plant growth medium therein, although the grow pockets can be sized to contain a greater or lesser volume of the plant growth medium if desired. In some embodiments, grow pockets of different sizes can be provided.

In some embodiments, the nutrient flow channels can be provided as separate strips of a flexible sheet material bonded to the back face of the support panel. In some embodiments, each column of a nutrient flow channel and aligned grow pockets can be formed as a separate panel assembly. Any number of separate panel assemblies can be attached together along longitudinal edges, parallel to the nutrient flow channels and columns of grow pockets. The panel assemblies can be attached by any suitable bonding mechanism, as discussed above.

In some embodiments, a panel assembly can include a single grow pocket. In some embodiments, two or more panel assemblies, each panel assembly including a single grow pocket or multiple grow pockets in a columnar arrangement, can be attached together in a single column. Any suitable bonding mechanism, as discussed above, can be used.

In some embodiments, two or more panel assemblies can be attached together to provide any desired configuration of grow pockets to suit a desired application or growing space. In some embodiments, two or more panel assemblies can be removably attached, to provide a modular device that can be reconfigured to suit different applications or different growing spaces.

In some embodiments, two panel assemblies can be installed in a growing environment back to back, such that two back panels are in contact or close contact with each other. In this manner, efficient use of space within the growing environment can be made, and a greater plant density can be achieved. In some embodiments, a panel assembly with grow pockets on opposite outer faces and inner shared nutrient flow channels can be provided.

Figure 17:
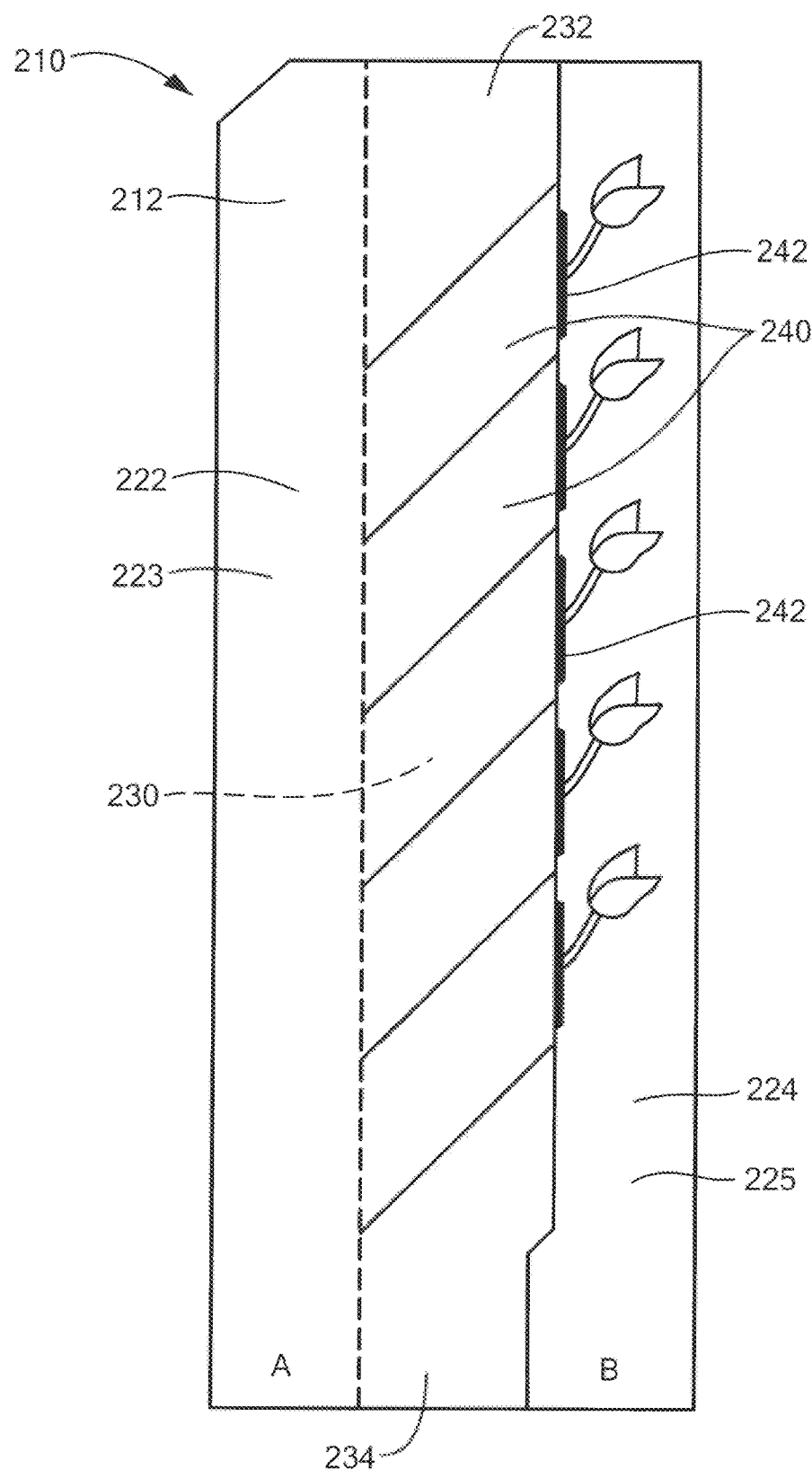
FIG. 17 is a schematic plan view of a further embodiment of a device for growing plants.
Figure 18:
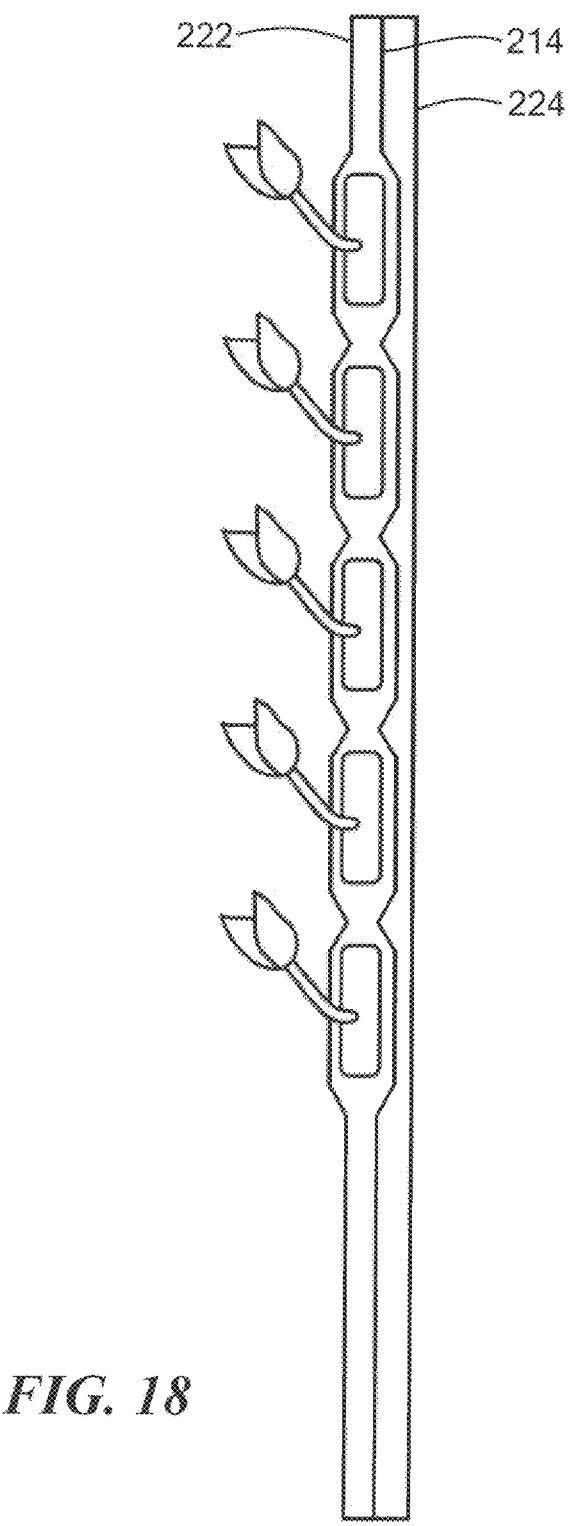
FIG. 18 is a schematic side view of the device of FIG. 17.
Figure 19:
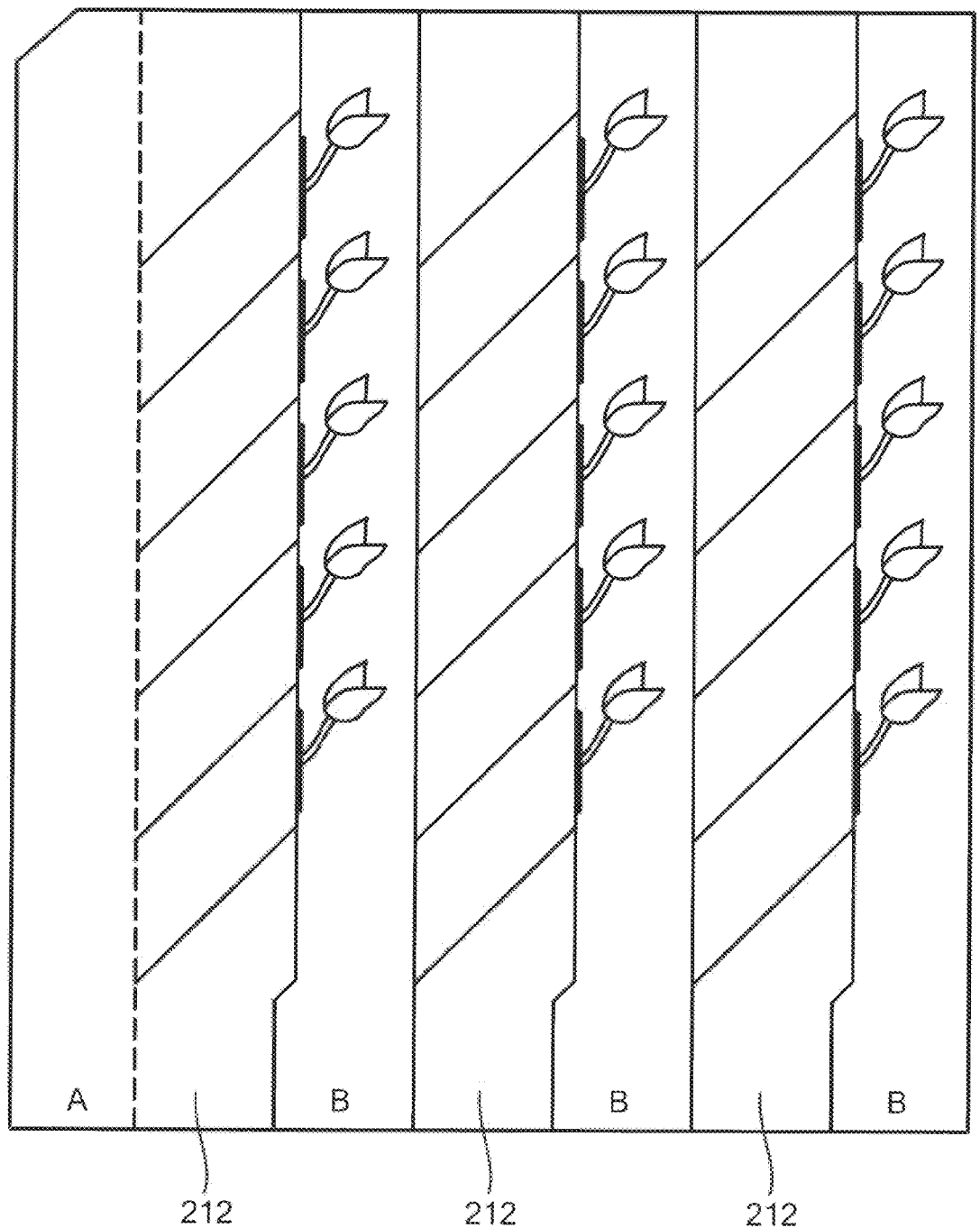
FIG. 19 is a schematic plan view of a plurality of devices of FIG. 17.

FIGS. 17 to 19 schematically illustrate an embodiment of a device 210 for growing plants including a panel assembly 212 having grow pockets 240 each with an access opening 242 that opens toward a side of the panel assembly. The device can include a support panel 214, a front panel 222, a back panel 224, and a nutrient flow channel 230 extending from an inlet 232 to an outlet 234, generally as described above. The back panel can include an extension 225 to the side adjacent the access openings (side B), and the front panel can include an extension 223 to the side opposite the access openings (side A). Multiple panel assemblies 212 can be joined by overlapping side B over side A and bonding the sides together in any suitable manner (see FIG. 19).

The device for growing plants described herein can be used to grow a large variety of plants, particularly, green, leafy plants. For example, the device can be used to grow leafy greens, such as lettuce, spinach, chard; brassicas, such as broccoli, cabbage, cauliflower, Brussels sprouts, kohlrabi, mustard, kale, arugula; and herbs such as basil, oregano, parsley, and mint. The device can be used for seed germination, post germination plant growth, or post seedling plant growth. As a plant grows too large, it can be transplanted to a device with a larger grow pocket or to pots or in the ground outdoors, as desired. The grow pockets can be sized and configured for plants such as tomatoes, flowers, or root vegetables. For example, a larger pocket can be provided to accommodate the growth of root vegetables such as carrots. Any suitable growing medium can be used, depending on the particular crop.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

It will be appreciated that the various features of the embodiments described herein can be combined in a variety of ways. For example, a feature described in conjunction with one embodiment may be included in another embodiment even if not explicitly described in conjunction with that embodiment.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

What is claimed is:

1. A device for growing plants comprising a panel assembly comprising:
   a support panel having a front face and a back face;
   a back panel fastened to the support panel along bond lines that form a nutrient flow channel supported on the back face of the support panel extending from an inlet at an upper region to an outlet at a lower region of the support panel, the support panel and the back panel being impermeable to retain a liquid nutrient solution within the nutrient flow channel;
   a front panel fastened to the front face of the support panel along bond lines that form a plurality of grow pockets, the plurality of grow pockets in vertical alignment with the nutrient flow channel, the front panel including a plant access opening therethrough to an interior of each grow pocket; and
   a plurality of fluid apertures in the support panel, each fluid aperture disposed at a lower region of an associated one of the plurality of grow pockets for fluid communication between the interior of each grow pocket and an interior of the nutrient flow channel.

2. The device of claim 1, wherein the bond lines that form the plurality of grow pockets include tapered bond lines extending from an area adjacent each plant access opening to a closed bottom bond line below the fluid aperture at each grow pocket.

3. The device of claim 1, wherein the plant access opening of each grow pocket comprises a first slit in the front panel extending across a top portion of the grow pocket and a second slit in the front panel extending orthogonally from the first slit toward the lower region of the grow pocket.

4. The device of claim 3, wherein the plant access opening of the grow pocket further comprises a cut away region of the front panel below the first slit.

5. The device of claim 1, wherein the plant access opening of each of the plurality of grow pockets opens toward a side of the panel assembly.

6. The device of claim 1, wherein the support panel and the back panel are bonded together along additional bond lines obliquely angled relative to each other at locations to direct a nutrient solution in the nutrient flow channel to the fluid apertures in the support panel.

7. The device of claim 1, wherein the back panel is fastened to the support panel along one or more further bond lines to form an additional nutrient flow channel supported on the back face of the support panel, and the front panel is fastened to the support panel along one or more further bond lines to form an additional plurality of grow pockets in vertical alignment with the additional nutrient flow channel, with an additional plurality of fluid apertures disposed through the support panel at each of the additional grow pockets.

8. The device of claim 7, further comprising a manifold along the upper region of the panel assembly to distribute the liquid nutrient solution from a nutrient solution source to each of the nutrient flow channels.

9. The device of claim 1, further comprising an additional nutrient flow channel and an additional plurality of grow pockets in vertical linear alignment with the additional nutrient flow channel, and wherein the additional nutrient flow channel and the additional plurality of grow pockets in vertical linear alignment therewith are formed by an additional front panel, an additional back panel, and an additional support panel fastened along adjacent longitudinal edges to the front panel, the back panel, and the support panel.

10. The device of claim 1, wherein the back panel, the support panel, and the front panel are fastened together along the bond lines with radio frequency welding, ultrasonic welding, heat sealing, an adhesive, mechanical fasteners, or stitching.

11. The device of claim 1, wherein each of the front panel, the back panel, and the support panel comprises a flexible sheet.

12. The device of claim 11, wherein the flexible sheet of each of the front panel, the back panel, and the support panel comprises polyvinyl chloride, polyethylene, or polypropylene.

13. The device of claim 1, wherein each of the support panel, the back panel and the front panel is formed from a waterproof material or includes a waterproof coating.

14. The device of claim 1, further comprising an inlet fixture attached to the inlet of the nutrient flow channel and connectable to a liquid nutrient solution source, and an outlet fixture attached to the outlet of the nutrient flow channel and connectable to or drainable to a collection reservoir.

15. The device of claim 1, further comprising a suspension assembly to suspend the panel assembly in a vertical orientation.

16. The device of claim 1, further comprising one or more structural stiffening elements extending parallel to at least a portion of a length of the nutrient flow channel.

17. The device of claim 16, wherein the structural stiffening element comprises a rib, a rod, or an air-filled channel.

18. The device of claim 1, wherein the nutrient flow channel is filled with the liquid nutrient solution and is free of a growing medium.

19. A method of growing plants, comprising:
   providing the device for growing plants of claim 1;
   disposing a plant or a seed in at least one of the grow pockets; and
   connecting a nutrient fluid for fluid flow to the inlet of the nutrient flow channel.

* * * * *